Sept. 29, 1953 E. BAUM 2,654,027
PULSE DEMODULATING SYSTEM
Filed Aug. 10, 1945

PULSE POSITION MODULATION

PULSE FREQUENCY MODULATION

NUMBER OF PULSES MODULATION

PULSE WIDTH

PULSE AMPLITUDE MODULATION

FREQUENCY MODULATION

C.W.-A.M.

*INVENTOR.*
ELMER BAUM

*BY*
William D. Hall.
ATTORNEY

Patented Sept. 29, 1953 2,654,027

UNITED STATES PATENT OFFICE 2,654,027

PULSE DEMODULATING SYSTEM

Elmer Baum, New York, N. Y., assignor to International Standard Electric Corporation, New York, N. Y., a corporation of Delaware Application August 10, 1945, Serial No. 610,162

10 Claims. (Cl. 250—20)

(Granted under Title 35, U. S. Code (1952), sec. 266)

The invention described herein may be manufactured and used by or for the Government for governmental purposes, without the payment to me of any royalty thereon.

This invention relates to a radio system capable of demodulating various types of modulation signals that cannot be demodulated readily by known monitoring devices without prior knowledge of the characteristics of the modulation signals.

The invention is particularly applicable for demodulating or decoding secret transmissions in the microwave regions where pulse-modulation methods are common.

In pulse modulation systems, it is known to transmit intelligence by varying the pulse-position, the number of pulses, the frequency of the pulse, the pulse width, and the amplitude of the pulses. In the case of pulse-width and pulse-amplitude modulation, the interception, decoding, and monitoring of the radio signals may be accomplished by means of known receivers designed to receive pulse-communication intelligence without prior knowledge of the characteristics of the transmitted signal. However, an intelligence transmitted by means of pulse-position, pulse-number, or pulse-frequency modulations, the usual pulse receivers cannot be used for monitoring the received signals unless the parameters of the receivers are adjusted so as to work in the region of the pulse permutations used for transmitting the intelligence signal, since in the systems of the latter type the receivers must be built specifically for the reception of the contemplated type of signals. Thus, ordinary C. W.-A. M. or F. M., or pulse modulation receivers are not suitable as monitoring devices in the latter case, and should monitoring of a radio frequency band with this type of transmission of intelligence be desired, it becomes necessary to evolve some other methods capable of translating the intercepted signals without prior knowledge of the specific characteristics of the signals. The invention discloses a monitoring device which is capable of accomplishing this purpose.

It is therefore an object of this invention to provide a demodulating system which is suitable for demodulating various types of modulation, such as C. W.-A. M. modulation, F. M. modulation, and pulse-modulation in which the intelligence is transmitted by varying the position, number, frequency, width, or amplitude of the transmitted pulses in response to the intelligence signal.

It is an additional object of this invention to provide a demodulating system capable of translating the received pulse-modulation signals into intelligence signals without prior knowledge of the characteristics of the modulation signals.

The novel features which are believed to be characteristic of the invention are set forth in the appended claims; the invention itself, however, both as to its organization and methods of operation, together with the further objects and advantages thereof, may best be understood by reference to the further description in connection with the accompanying drawings, in which:

Figure 1:
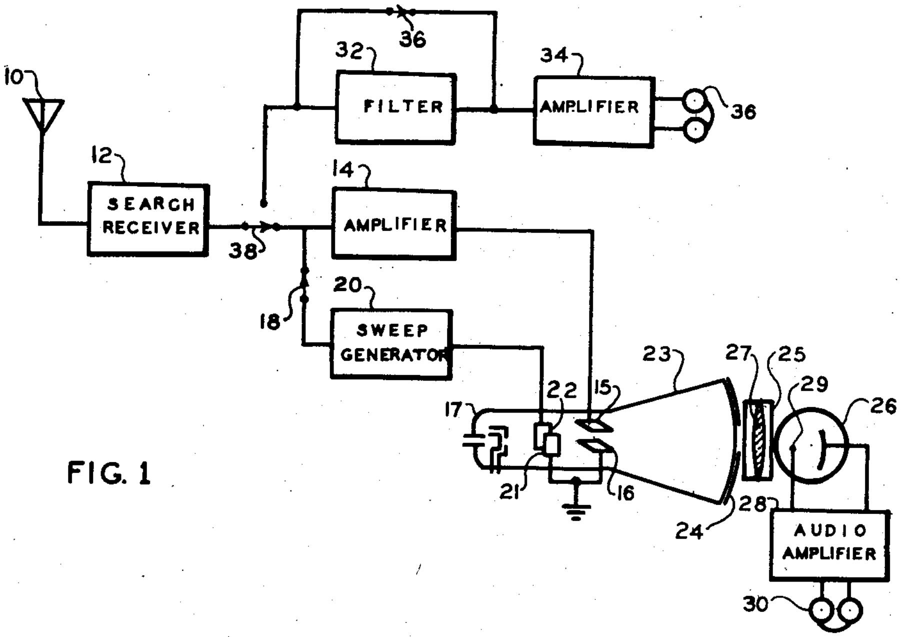
Figure 1 is a block diagram of a monitoring system.
Figure 2:
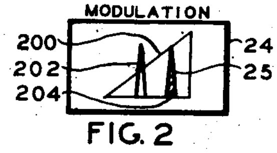
Figures 2 through 10 illustrate the various apertures suitable for their use with the monitoring system, and the effects of various pulse-modulations on the images appearing at the apertures.
Figure 9:
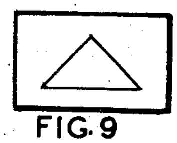
Figure 10:
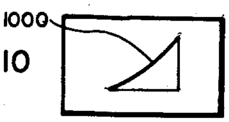

Referring to Fig. 1, the signals are intercepted by a non-directional wide-band antenna 10, whereupon they are impressed on a receiver 12 which may be a super-heterodyne receiver or an ordinary detector receiver, should crystal-type of detection of a U. H. F. signal be preferred. The video signals appearing in the output of the receiver are impressed on an amplifier 14 and the output of the latter is connected across the vertical deflection plates 15—16 of a cathode-ray tube 17 having a screen of medium retentivity. The output of the receiver is also impressed over a conductor 18 on a sweep circuit 20 for timing the generation of a saw-tooth wave used on the horizontal deflection plates 21—22 of the cathode-ray tube. When the intercepted signals are of the pulse type, the sweep generating circuit 20 should include a resistance-condenser network for integrating the received group of pulse signals, timing of the saw-tooth wave being performed by means of this integrated signal rather than by the individual pulses. When the intercepted signals are of the C. W. type, connection 18 is not used, and the sweep generating circuit is synchronized by hand. An aperture plate 24 is placed directly on a screen 23 of the cathode-ray tube, the aperture being preferably in the form of a triangular opening 25 as illustrated in Figs. 2 and 9. An optical system, including an image-forming lens 27, is placed directly behind and coaxially with aperture 25, this lens forming, on the photo-sensitive surface of a photo-electric cell 26, an image of the visual indications produced on the oscilloscope screen. The optical system is arranged so that a sufficiently diffused image is produced on the photo-sensitive surface of the photo-electric cell so that an anode 29 of the cell is incapable of forming any image-intercepting shadows. The photo-electric cell is connected to an audio-amplifier 28, and the output of the latter is impressed on a suitable transducing device 30 which transforms the audio signals into sound waves. The demodulating system is also provided with an auxiliary channel including a low band-pass filter 32, an amplifier 34 and earphones 36 which may be connected to the output of receiver 12 by turning a switch 38 to the upper position.

The operation of the system disclosed in Fig. 1 is as follows:

With the optical system 27 and photo-electric cell 26 removed from screen 23, a signal is tuned in at the receiver and brought into focus and synchronization on the screen of the oscilloscope by adjusting the sweep generator 20 and biasing and focusing potentials of the cathode-ray tube. The exact procedure that is followed for obtaining an image of a signal on the oscilloscope screen is as follows: when tuning of the receiver is gradually shifted from one end of the frequency band to the other for monitoring this band, and there are no signals intercepted by antenna 10, all that is visible on the screen of the oscilloscope is the so-called "grass," which is a descriptive term used by the monitoring operators for the interference and noise signals which produce a flickering image on the oscilloscope screen having the appearance of grass, hence the name. When a signal is intercepted, because of the action of the automatic volume control circuit in the receiver, the gain of the receiver is automatically decreased by the A. V. C. circuit and the grass signal on the oscilloscope screen becomes at once smaller, and changes noticeably in appearance. If the A. V. C. circuit is provided with some indicating device, such as a magic eye indicator, the interception of a signal is also indicated on this device and the next step consists of adjusting the timing of the sweep circuit as well as its repetition rate in well known manner until either steady or shifting images, depending upon the type of modulation intercepted by the receiver, appear on the screen of the oscilloscope. If the modulation is of the C. W.-A. M. type, or F. M. type, or pulse-modulation type, it is detectable by ordinary receivers as mentioned previously. To ascertain whether the signal is of the type which can be demodulated by ordinary means, switch 38 may be operated to its upper position and the intercepted signal impressed on a band-pass filter 32 and amplifier 34 which impresses the intelligence signal on the earphones 36. In this case the use of a photo-electric cell demodulator may be avoided altogether and conventional monitoring circuits including receiver 12, filter 32 and amplifier 34 used for accomplishing the sought result. The use of filter 32 is necessary only when the intercepted signal is a pulse-modulation signal and it is shorted by means of a switch 36 when C. W.-A. M. modulation is intercepted. As a rule the images appearing on the screen of the oscilloscope give fair indication so as to apprise the operator of the type of intercepted signal. However, when pulse-modulation of the pulse-position, pulse-number, or pulse-frequency type is intercepted and receiver 12 is incapable of interpreting them, the pulses are imaged on the oscilloscope screen in the manner described previously, and after securing the best obtainable images of the pulses by adjusting the sweep circuit, optical system 27 and photo-electric cell 26 are swung into that position which places them against the screen of the oscilloscope, and the detection of the images is then performed with the aid of aperture 25, photo-electric cell 26 and amplifier 28. In this type of detection, the received signals—in the detected form—are impressed on amplifier 14, and the latter in turn impresses them on the vertical plates of the cathode-ray tube where they produce A-scan representation of the received signals along a horizontal sweep produced by the saw-tooth wave. The received signals are thus detected by means of the oscilloscope and photo-electric cell 26, into a variable space current in the photo-electric cell, which is varied in accordance with the modulation of the signal because of the presence of the triangular aperture 24 between the screen of the oscilloscope and the photo-electric cell. These signals are impressed on an audio amplifier 28 which, after amplification, impresses them on the earphones 30 for translating these signals into audible intelligence signals.

Detection of the pulse signals with the aid of the cathode-ray tube and aperture 25 is illustrated more fully in Figs. 2 to 10.

Fig. 2 illustrates two positions 200 and 202 of the intercepted pulse. The amplitude of the intercepted pulse is constant and the intelligence signal is transmitted by varying the position of pulse 204, hence the term pulse-position modulation. Any displacement of pulse 204 with respect to aperture 25 will either increase or decrease the amount of light intercepted by the photo-electric cell, and therefore the photo-electric cell is capable of detecting the pulse-position modulation. It is to be noted that while aperture 25 is illustrated as having its "detecting edge" 200 in a form of a straight line, this edge may be given in a concave form 1000, illustrated in Fig. 10, to improve the detection of the signal.

Figure 3:
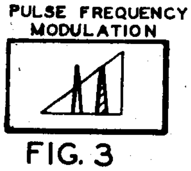

In Fig. 3, a pulse-frequency modulation is illustrated, the detection of the signal being identical in all respects to that illustrated in Fig. 2. Since, in pulse-frequency modulation, the change in the number of pulses is ordinarily too small as compared to the velocity of the sweep, the use of the triangular aperture is preferable to the use of a rectangular aperture, since, as applied to the system illustrated in Fig. 1, and especially aperture 25, the pulse-frequency modulation exhibits itself primarily as a pulse-position phenomenon.

Figure 4A:
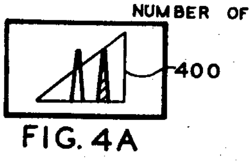
Figure 4B:
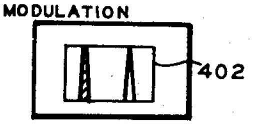

Fig. 4 illustrates the types of apertures which may be used with that type of modulation in which the intelligence is transmitted by varying the number of the transmitted pulses per given time. Either a triangular aperture 400, or a rectangular aperture 402, may be used in this instance, the choice of aperture depending upon the velocity of the sweep and the encountered rate of pulse change. When the change in the number of the transmitted pulses per given time is relatively small, as compared to the velocity of the sweep, aperture 400 must be used and when the rate of pulse change is considerably higher, a rectangular aperture 402 may be used. In the latter case the total light intercepted by the photo-electric cell varies with the number of pulses appearing in the aperture.

Figure 5:
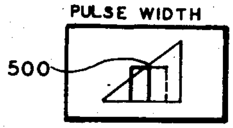

In Fig. 5, the effect of pulse-width modulation on the aperture is illustrated, it is obvious that in this case a triangular aperture 500 must be used for detecting the signal.

In Fig. 6, which illustrates a pulse-amplitude modulation, either a rectangular, or a triangular aperture may be used, depending upon the degree of detection and integration performed by the circuits in the receiver 12. When the output of the receiver is such that the pulse-amplitude modulation appears as an integrated signal, it produces a variable-amplitude line 600 on the screen of the oscilloscope and when this is the case, a triangular aperture must be used for detecting the signal. When the signals are not integrated and appear as individual pulses 602, 603 of variable amplitude, a rectangular aperture 604 will give better detection than the triangular aperture.

Figure 7:
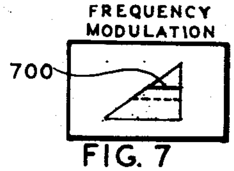
Figure 8:
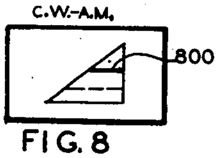

Figs. 7 and 8 illustrate the detection of frequency modulation and continuous-wave-amplitude-modulation respectively. In both cases the detection is similar to that of Fig. 6a since the detected signal exhibits itself as a variable-amplitude line 700 or 800; therefore triangular apertures should be used in this case.

Figure 6A:
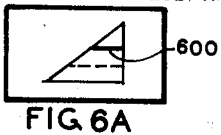
Figure 6B:
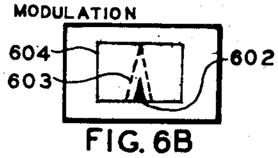

The detection system may be so designed that either a triangular aperture of the type illustrated in Fig. 2, or a rectangular aperture illustrated in Fig. 6b, may be placed against the screen of the oscilloscope, depending upon the type of image produced on the screen, the form of the image dictating the choice of the optimum aperture.

From the description of the invention it is apparent that it is especially suitable for monitoring radio frequency signals which transmit the intelligence by means of pulse-position, pulse-number and pulse-frequency modulation. The detection and translation of the intercepted pulse of this type is made possible by means of a cathode-ray oscilloscope and a photo-electric cell, the sweep circuit of the cathode-ray oscilloscope having all the necessary adjustable networks for selecting and positioning the intercepted signals in proper time relationship with respect to the aperture. It is the adjustable circuits of the cathode-ray oscilloscope that make the detection of such signals possible in the pulse receivers suitable for the reception of the pulse-position, pulse-number or pulse-frequency modulations. The parameters of the receiver circuit can not be made very readily adjustable over the necessary range of all possible permutations and therefore the receivers of this type are usually designed with fixed networks adapted to receive the specific type of modulation. By using a cathode-ray oscilloscope, an aperture, a photo-electric cell, and an adjustable sweep circuit, monitoring of the pulse-position, pulse-number and pulse-frequency modulation, irrespective of the large variety of possible permutations in modulations of this type, is made possible through the adjustment of the sweep circuit.

While the invention has been described with reference to several particular embodiments, it will be understood that various modifications of the apparatus shown may be made within the scope of the following claims.

I claim:

1. A radio monitoring system, for monitoring radio pulse-communication transmission using pulse-position modulation, including a search receiver, a cathode-ray oscilloscope having its vertical deflection plates connected to said receiver, an aperture plate in front of the screen of said oscilloscope having a triangular aperture with one side of the triangle being parallel to the base-line produced by the electron beam on the screen of said oscilloscope, said side thus acting as a base-line of said aperture, a photo-electric cell, an optical system between said aperture and said cell for focusing light appearing at said aperture on the cathode of said cell, an amplifier connected to said cell, a transducer connected to said amplifier, and a sweep generator, the output of said sweep generator being connected to the horizontal plates of said oscilloscope, and the input of said generator being connected to said receiver for timing the sweep voltage of said generator so as to reproduce the intercepted pulse signals as stationary visual images of said pulses along the base-line of said aperture so long as said pulses are transmitted at a constant repetition rate, and shiftable along the base-line of said aperture in response to said pulse-position modulation.

2. A radio monitoring system for monitoring radio energy having a variable number of pulses per unit-time modulation, said system including a search receiver, a cathode-ray oscilloscope having its vertical deflection plates connected to said receiver, a plate having a triangularly formed aperture in front of the screen of said oscilloscope, one side of said aperture being parallel to the base-line produced by the electron beam on the screen of said oscilloscope, said side thus acting as a base-line of said aperture, a photo-electric cell, an optical system between said aperture and said cell for focusing light appearing at said aperture on the cathode of said cell, an amplifier connected to said cell, a transducer connected to said amplifier, and a sweep generator having its output connected to the horizontal plates of said oscilloscope, and its input to said receiver for timing the sweep voltage of said generator so as to reproduce the intercepted pulse signals as stationary visual images of said pulses along the base-line of said aperture as long as the number of the transmitted pulses per unit time is equal to a predetermined value, the timing of said sweep voltage being adjusted so as to shift the position of said visual images with respect to said aperture in response to a change in the number of pulses transmitted per unit of time.

3. A demodulator for time modulated pulses comprising means for producing a beam of energy, means for causing said beam to sweep through a cyclic movement in synchronism with the timing of said pulses in the absence of modulation, whereby coincidence of said pulses and a given part of said beam movement is varied in proportion to the amount of time modulation of said pulses, and means for causing a flow of electrical energy proportional in amplitude to the degree of coincidence of said pulses and said given part of the cyclic movement of said beam.

4. A demodulator according to claim 3, wherein the means for causing flow of energy includes means for deflecting the beam from its normal movement with respect to said given part of its cyclic movement according to the energy of said pulses.

5. A demodulator according to claim 3, wherein the means for causing the beam to have a cyclic sweep movement includes means for producing a voltage in response to the time modulated pulses which is of substantially constant cyclic pattern, and means for deflecting said beam according to said voltage.

6. A demodulator for time modulated pulses comprising means for producing a beam of energy, a beam sensitive device, means for causing said beam to sweep through a cyclic movement, the path of which bears a given relationship with respect to the location of said device, means for causing said beam to coincide with said device in response to at least certain of said pulses, and a circuit associated with said device for conducting a flow of current in response to coincidence of said beam and said device.

7. A demodulator according to claim 6, wherein said device includes means for producing light upon coincidence with said beam and means responsive to intensity of said light to produce flow of current.

8. A demodulator according to claim 6, wherein said device includes a fluorescent screen responsive to said beam for producing light, a light responsive cell associated with said screen and means for defining the active area of said screen with respect to said cell.

9. A demodulator for time modulated pulses comprising means for producing a cathode ray beam, means for producing a sweep voltage for controlling the cyclic movement of said beam to cause said beam to follow a given path, means for synchronizing said sweep voltage with the timing of said pulses in the absence of modulation, a beam responsive device for producing a current when said beam coincides with said device, and means to cause said beam to coincide with said device in accordance with the time characteristics of at least certain of said pulses.

10. A demodulator according to claim 9, wherein the means for controlling said beam in accordance with said pulses includes means for deflecting the beam from its normal path of movement in response to the energy of said pulses, the deflection of said beam controlling the degree of coincidence of the beam with respect to said device.

ELMER BAUM.

References Cited in the file of this patent

UNITED STATES PATENTS

| Number | Name | Date |
|---|---|---|
| 2,144,337 | Koch | Jan. 17, 1939 |
| 2,183,717 | Keall | Dec. 19, 1939 |
| 2,403,625 | Wolff | July 9, 1946 |
| 2,403,729 | Loughren | July 9, 1946 |
| 2,405,252 | Goldsmith | Aug. 6, 1946 |
| 2,407,169 | Loughren | Sept. 3, 1946 |
| 2,408,702 | Sziklai | Oct. 1, 1946 |
| 2,438,928 | Labin | Apr. 6, 1948 |

FOREIGN PATENTS

| Number | Country | Date |
|---|---|---|
| 254,353 | Great Britain | July 2, 1926 |